(12) United States Patent
Senftner et al.

(10) Patent No.: US 7,974,493 B2
(45) Date of Patent: *Jul. 5, 2011

(54) PERSONALIZING A VIDEO

(75) Inventors: Blake Senftner, Burbank, CA (US); Liz Ralston, Burbank, CA (US); Miles Lightwood, Glendale, CA (US); Todd Shifflett, Venice, CA (US)

(73) Assignee: Flixor, Inc., Burbank, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 12/765,785

(22) Filed: Apr. 22, 2010

(65) Prior Publication Data
US 2010/0202750 A1 Aug. 12, 2010

Related U.S. Application Data

(63) Continuation of application No. 12/326,043, filed on Dec. 1, 2008, now abandoned, which is a continuation of application No. 11/840,834, filed on Aug. 17, 2007, now Pat. No. 7,460,731, which is a continuation of application No. PCT/US2006/036150, filed on Sep. 14, 2006.

(60) Provisional application No. 60/717,852, filed on Sep. 16, 2005, provisional application No. 60/717,937, filed on Sep. 16, 2005, provisional application No. 60/717,938, filed on Sep. 16, 2005.

(51) Int. Cl.
*G06K 9/36* (2006.01)

(52) U.S. Cl. ........................................ 382/282

(58) Field of Classification Search .......... 382/284, 382/103, 100, 305, 282–283, 276; 348/586–591, 348/598–600, 700, 722, 578, 36, 39, 135–145, 348/169–172; 715/723; 707/1–7, 104.1; 386/52, 55, 95, 54, 53; 358/537, 538, 540, 358/452–453
See application file for complete search history.

(56) References Cited

U.S. PATENT DOCUMENTS

| | | | |
|---|---|---|---|
| 6,283,858 B1 | 9/2001 | Hayes, Jr. et al. | |
| 6,476,826 B1* | 11/2002 | Plotkin et al. | ........... 715/723 |
| 6,795,818 B1 | 9/2004 | Lee | |
| 6,826,292 B1 | 11/2004 | Tao et al. | |
| 6,970,639 B1 | 11/2005 | McGrath et al. | |
| 7,230,653 B1 | 6/2007 | Overton et al. | |
| 7,460,731 B2* | 12/2008 | Senftner et al. | ........... 382/284 |

(Continued)

FOREIGN PATENT DOCUMENTS

| | | |
|---|---|---|
| WO | WO0235823 A2 | 5/2002 |
| WO | WO03005306 A1 | 1/2003 |
| WO | WO2005076618 A1 | 8/2005 |
| WO | 2007/035558 | 3/2007 |

OTHER PUBLICATIONS

European Patent Office, European Patent Application No. 06803726.6, mailed May 31, 2010, 9 pages.

*Primary Examiner* — Sherali Ishrat
(74) *Attorney, Agent, or Firm* — Fish & Richardson P.C.

(57) ABSTRACT

Processes and apparatus for personalizing video through partial image replacement are disclosed. Personalization may include partial or full replacement of the image of an actor, an object or both. Personalization may also include insertion or replacement of an object, and full or partial replacement of the background and/or sound track. A video preparation process may be used to create a library of personalization-ready videos.

11 Claims, 11 Drawing Sheets

U.S. PATENT DOCUMENTS

| | | |
|---|---|---|
| 2002/0018070 A1 | 2/2002 | Lanier |
| 2002/0051119 A1 | 5/2002 | Sherman et al. |
| 2003/0007700 A1* | 1/2003 | Gutta et al. .................. 382/282 |
| 2003/0228135 A1 | 12/2003 | Illsley |
| 2005/0007384 A1 | 1/2005 | Yamada et al. |
| 2009/0080855 A1 | 3/2009 | Senftner |

* cited by examiner

PERSONALIZING A VIDEO

PRIORITY CLAIMS AND RELATED APPLICATION INFORMATION

This application is a continuation application of and claims the priority of U.S. patent application Ser. No. 12/326,043, filed on Dec. 1, 2008 now abandoned (U.S. Published Application No. 2009-0080855) which is a continuation application of and claims the priority of U.S. patent application Ser. No. 11/840,834, filed on Aug. 17, 2007 now U.S. Pat. No. 7,460,731 which is a continuing patent application of and claims priority to PCT Application No. PCT/US2006/036150 entitled "PERSONALIZING A VIDEO" and filed on Sep. 14, 2006 (PCT Publication No. WO2007/035558) which, under 35 U.S.C. §119(e)(1), claims priorities from the following prior U.S. patent applications: Application No. 60/717,852 filed on Sep. 16, 2005 and entitled "Facial image replacement;" Application No. 60/717,937 filed Sep. 16, 2005 and entitled "Customized product marketing images;" Application No. 60/717,938 filed on Sep. 16, 2005 and entitled "Call and message notification."

The above referenced PCT application and U.S. patent applications are incorporated by reference in their entirety as part of the specification of the present application.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights.

TECHNICAL FIELD

This disclosure relates to systems, processes and apparatus for manipulating, processing and producing video creating personalized videos through partial image replacement.

BACKGROUND

Digital image recording, storage, and synthesis are now widely used in television, motion pictures, and video games. A digital video is essentially a series of digital photographs, commonly termed "frames," of a scene taken at periodic intervals. A digital video may be recorded using a digital video camera, may be created by digitizing an analog video recording or by digitizing a motion picture film recording, may be created by rendering 2D and 3D computer graphics, or even a hybrid combination of all the above with analogue or digital compositing of the various elements to realize a final digital video. To give the viewer an impression of smooth, continuous motion, digital or analog video images are typically comprised of 25, 30, 60, or more frames every second. However, the number of frames per second should not be viewed as a limiting factor to identify a digital video; some digital video formats support as few as 1 frame every N seconds, or even a variable frame rate as necessary to achieve the effect of perceived motion while attempting to reduce the final storage size of the resulting digital video. Whatever the frame rate, each frame may be divided into a plurality of horizontal lines, and each line is typically divided into a plurality of picture elements, commonly termed "pixels", per line. Standard broadcast video recordings in the United States have 525 lines per frame, and HDTV recordings have 1080 lines per frame. However, for the purposes of this description, the term "digital video" is meant in the broader sense of simply a series of images that when viewed in sequence depict the representation of the passage of time within one or more settings. The number of images, the rate of display of the images, and the dimensions of the images is irrelevant. Yet the images are still conventionally identified as comprised of lines and pixels, even though throughout the various steps of the processes disclosed herein, the number of lines and pixels per frame may be statistically re-sampled, as necessary, for the precision of accuracy required by various steps.

Each frame of a digital video is therefore comprised of some total number of pixels, and each pixel is represented by some number of bits of information indicating the brightness and color of the respective portion of the image. Throughout the plurality of methods that a digital video may be created, all are essentially a series of images, represented as a series of frames composed of lines and pixels. Various means of representing a digital video in bits and bytes exist, but at some level all can be referenced as frames, lines and pixels.

A digital video requires a display medium to view the frames in sequence. A display medium is typically electronic, such as a TV, computer and monitor, a cellular phone or a personal digital assistant (PDA). These devices receive or possess the digital video in the form of a file, and display the frames in sequence to the user. Other potential display mediums that are not electronic exist, which are also a method for a user to experience a digital video. Examples of these mediums are 1) printed holograms of the nature found on credit/debit cards and collectable sports cards, 2) digital paper that employs chemical and other non-electronic image encoding methods, 3) simple printed flipbooks.

SUMMARY

Apparatus, systems and techniques for providing personalized digital video in various applications are described. One or more target images, such as an actor and an object, in an original digital video can be replaced based on user preferences to produce a personalized digital video. Such a personalized video can be used for advertising a product or service by inserting one or more images associated with the product or service in the personalized video.

In one implementation, a computer-implemented process for providing personalized digital video can include selecting a target in original digital video to be replaced by a target replacement, wherein the target is a portion or an entirety of an actor or an object other than an actor in the original digital video; analyzing each frame of the original digital video to track a change in the selected target in the original digital video to capture data on the selected target, wherein the captured data includes at least information on a position, orientation and size of the selected target in the original digital video; and replacing the selected target with an image that resembles a continuation of a scene adjacent to the target in the original digital video to produce altered digital video in which the selected target is removed.

In another implementation, a computer-implemented process for providing personalized digital video can include storing altered digital video files based on original digital video files in a video library. At least one target in an original video file is removed in a corresponding altered digital video file and is substituted by an image that resembles a continuation of a scene adjacent to the target in a frame of the original digital video file, and the target is a portion or an entirety of an actor or an object other than an actor in the original digital video file. This method includes receiving, via a computer in communication with a network, a request from a user for personalizing a user selected altered digital video file by replacing a target in a corresponding original digital video file with a user target replacement identified by the user; and retrieving, from the video library, data on the target that is removed from the user selected altered digital video file. The data includes at least information on a position, orientation and size of the target in the original digital video file for the user selected altered digital video file. This method further includes applying the retrieved data on the target, frame by frame, to transform the user target replacement received from the user into a modified user target replacement that acquires characteristics of the target in the corresponding original digital video file; and inserting the modified user target replacement at a position of the target in each frame of the user selected altered digital video file in which the target appears in the original digital video file to substantially match at least the position, orientation and size of the selected target in the original digital video file to produce a personalized digital video file.

In another implementation, a system for providing personalized digital video can include a network for communications; and a video library to store altered digital video files based on original digital video files. At least one target in an original video file is removed in a corresponding altered digital video file and is substituted by an image that resembles a continuation of a scene adjacent to the target in a frame of the original digital video file, and wherein the target is a portion or an entirety of an actor or an object other than an actor in the original digital video file. This system includes at least one computer in communication with the network and the video library. The computer is operable to interface with a user via the network and to receive a request from the user for personalizing a user selected altered digital video file by replacing a target in a corresponding original digital video file with a user target replacement identified by the user. The computer is operable to retrieve from the video library data on the target that is removed from the user selected altered digital video file, where the data includes at least information on a position, orientation and size of the target in the original digital video file for the user selected altered digital video file. This computer is also operable to apply the retrieved data on the target, frame by frame, to transform the user target replacement received from the user into a modified user target replacement that acquires characteristics of the target in the corresponding original digital video file, and to insert the modified user target replacement at a position of the target in each frame of the user selected altered digital video file in which the target appears in the original digital video file to substantially match at least the position, orientation and size of the selected target in the original digital video file to produce a personalized digital video file for the user.

In another implementation, a computer-implemented process for providing personalized video can include providing a user selected altered digital video file by replacing a target in a corresponding original digital video file with a user target replacement identified by the user; and obtaining data on the target that is removed from the user selected altered digital video file. The data includes at least information on a position, orientation and size of the target in the original digital video file for the user selected altered digital video file. This process includes applying the obtained data on the target, frame by frame, to transform the user target replacement into a modified user target replacement that acquires characteristics of the target in the corresponding original digital video file; and inserting the modified user target replacement at a position of the target in each frame of the user selected altered digital video file in which the target appears in the original digital video file to substantially match at least the position, orientation and size of the selected target in the original digital video file to produce a personalized digital video file.

In another implementation, a process is provided for personalizing an original digital video containing an image comprising an original background scene and a foreground including an original actor. This process includes tracking the position, orientation, and expression of the original actor; replacing at least a key portion of the original actor with an image that continues the background scene; inserting a new actor into the video, the new actor substantially matching the position, orientation and expression of the replaced portion of the original actor; recreating illumination and shading effects on the new actor; and recreating shadows and reflections of the new actor.

In another implementation, a process for personalizing a video can include providing a video library of a plurality of prepared videos, each of the prepared videos resulting from a video preparation process; providing an actor model library of one or more new actor models where each of the models resulting from an actor modeling process; selecting a video from the video library; selecting a new actor model from the actor model library; and applying a personalization process to create a personalized version of the selected video using the selected new actor model.

In another implementation, a process is provided for creating a personalized version of an original digital video and the original video contains an image of an original actor. This process includes replacing at least a portion of the image of the original actor with an image of a new actor; and inserting an image of a new object into the video.

In yet another implementation, a computing device is provided to create a personalized version of an original digital video containing an image comprising a background scene and a foreground including an image of an original actor. This computing device includes a processor, a memory coupled with the processor, a storage medium having instructions stored thereon which when executed cause the computing device to perform actions. These actions include comprising personalizing a video where the video contains an image including an image of an original actor, tracking the position, orientation, and expression of the original actor; replacing at least a key portion of the original actor with an image that continues the background scene; inserting a new actor into the video where the new actor substantially matches the position, orientation and expression of the replaced portion of the original actor; recreating illumination and shading effects on the new actor; and recreating shadows and reflections of the new actor.

These and other implementations and associated features are described in greater detail in the attached drawings, the description and the claims.

DETAILED DESCRIPTION

Figure 1:
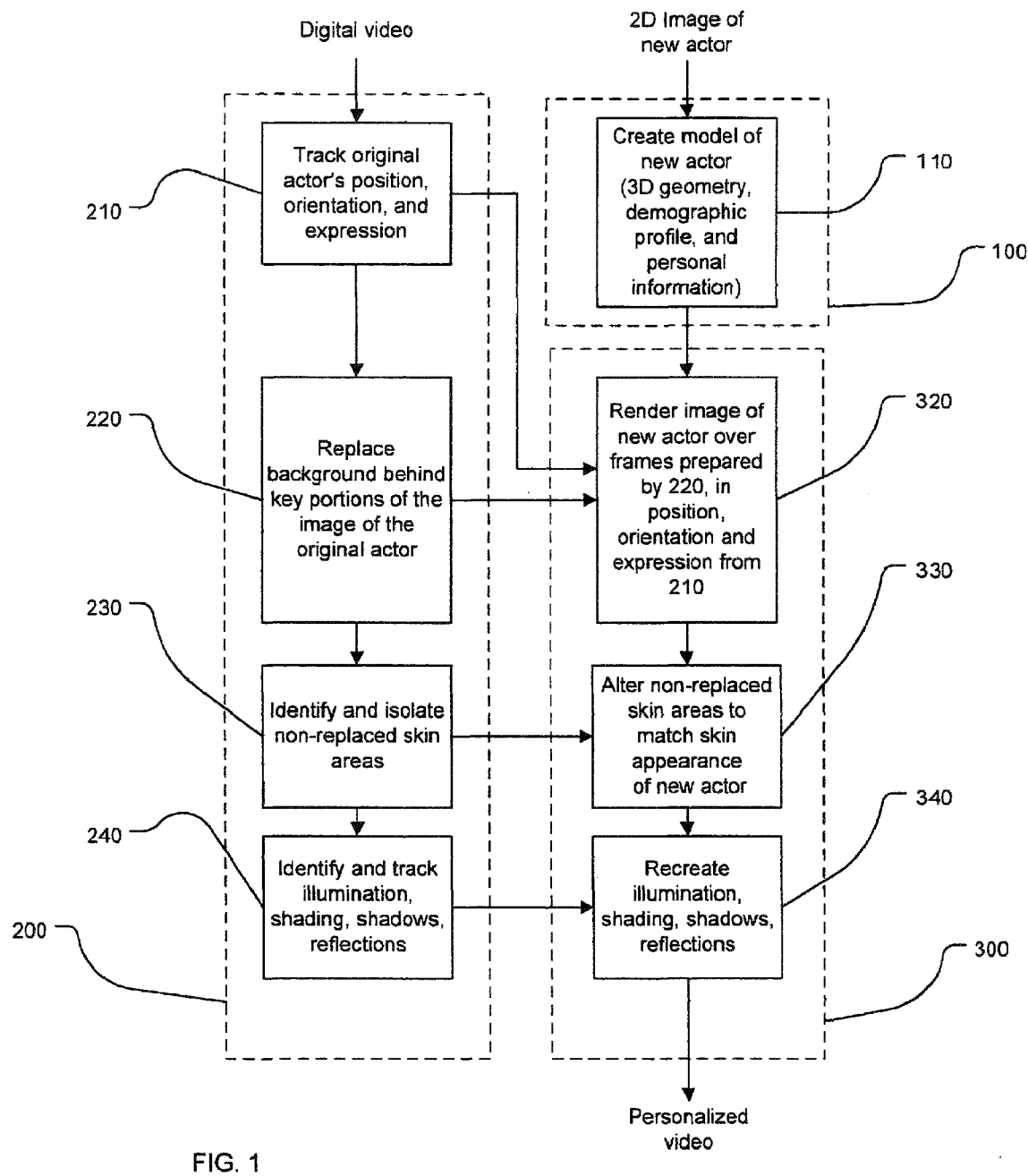
FIG. 1 is a flow chart of a process to create a personalized digital video.

Throughout this description, the embodiments and examples shown should be considered as exemplars, rather than limitations on the apparatus and methods disclosed or claimed.

Throughout this description, the terms "digital video clip", "video clip", "clip" and "digital video" all connote a digital encoding of a series of images with the intent to view the images in sequence. There is no implied limitation on a digital video's duration, or the final medium which a digital video may be expressed. Examples of a digital video include, but are not limited to, the following: a portion of a current or classic movie or television show, an entire film or TV show, an advertisement, a music video, or a specialty clip made specifically for personalization (for example, a clip that can be personalized to show the new actor with a "celebrity friend"). A single frame image, e.g., one from any of the previous examples, can be considered a digital video for some implementations within the context of this specification. Likewise, a single image composed via a collage technique between still frame images and other digital image manipulation and creation techniques can also be considered a digital video in some implementations within the context of this specification. A digital video may be generated via various methods. For example, a digital video may have been recorded using a digital video camera, may have been digitized from an analog video camera or film recording, may have been retrieved from a digital medium such as a DVD, may have been created by combining multiple still images placed on a timeline for animation purposes, may have been created by a composite process employing any of the above and other processes not described here, or otherwise.

The creation of personalized video is a combination of multiple fields that in totality allow for the alteration of video sequences such that individuals are able to replace the participants of an original video with themselves, their friends, their family members or any individuals, real or imagined, which they have images depicting. This replacement of participants in an original video may only require, but is not limited to, the replacement of the face, portions of the head and/or connecting skin as visible in the original video due to framing of the view and/or occluding individuals and objects in the video sequence blocking the view of the entire replaced individuals' bodies, costumes and/or wardrobe worn by the role depicted by the replaced character within the storyline of the video sequence and so forth. Depending upon the content of the storyline depicted within the original video, the replacement of participants within the video may include portions of their other visible skin, such as hands, arms, legs and so on.

Furthermore, the replacement desired may be carried to an extreme with the essential removal of the original actor in the video sequence, the removal of their shadow, reflection and visual influence upon other objects in the scene with a completely synthesized version (a "digital double") of the replacing individual and the addition of their characteristic shadow, reflection and other visual influences upon other objects in the scene.

Depending upon the quality of the desired replacement, and the impact of this desired quality upon the storyline of the original video, essential elements of the replaced actors interpretation and meaning within the context of the storyline may be altered. For example, by replacing a muscular, heroic male in a video with that of a petite female, the storyline remains essentially unaltered, but the interpretation of the storyline is drastically altered for effect. In order for such alteration to occur, the replacement of the face and portions of the head is not enough to achieve this result; in this situation a complete removal of the original actor is executed, their key motions are preserved in a secondary storage medium, and then referenced for the animation and insertion of the petite female's digital double.

Between the two extremes of face/head with connecting skin and a complete digital double lies an infinite range of degrees which actor replacement could be executed. Note that in all instances of this infinite range, the storyline and essential actions of the actors in the original video may be unaltered.

A personalized video can be personalized in various ways. In one example, a personalized video is a video sequence that is altered via one or more actor replacements. In another example, a personalized video is a video sequence that does not include any actor replacements—and includes non-actor objects and/or set pieces within the video which have been altered and/or replaced with other objects and/or set pieces. In yet another example, a personalized video is a video sequence that is altered via a combination of (1) at least one actor replacement or alternation and (2) at least one object replacement or alternation. The objects and/or set pieces that have been altered and/or replaced may be selected based a user criterion, such as some demographic or other information about the receiver and/or viewer of the digital video. For example, a video advertisement for a pizza restaurant could receive personalization such that the video advertisement appears to take place at the specific local neighborhood franchise of the video's viewer. In this instance, no actor replacement has occurred, but the video is personalized due to the local world-space context of the new advertisement having a personal connection with the viewer—it now takes place in their neighborhood. A further example of a non-actor replacing personalized video would be a video depicting a character drinking some brand of soda, where the brand of soda has been altered to be a brand of soda that appeals to the demographic of the viewer. Different viewers, being members of different demographic populations, would receive different alterations for the brand of soda being consumed by the video's character—making each video personalized to fit to the demographic tastes of each viewer.

Certain theater systems use stereopsis to provide an illusion of a three-dimensional (3D) image. These systems present separate images or film 2D channels for each of the viewer's eyes. The two image channels may be presented on a common surface and separated at the viewer's eyes by specialized glasses with polarized or colored lenses. Other optical techniques may be employed such that each image channel is only presented to the appropriate eye. Although the discussion in this disclosure is primarily directed to personalizing conventional (2D) videos, the personalization techniques disclosed herein could be also applied to the two image channels of a stereographic 3D display system.

A personalized video may be provided in a range of possible formats including, but not limited to, the following:

(a) A Digital Rights Management free format that allows for downloading and free exchange and trading of the video. In advertising applications, due to the potential presence of product placements, advertisers may benefit from having personalized videos exchanged, traded and displayed in as many locations as possible.

(b) A Digital Rights Management enabled format that only allows the download and playback on specific devices by specific individuals, such as the purchase of a personalized video for playback on specific devices.

(c) 3gp, 3gpp, mv4, gif or other public or proprietary digital video or digital image formats that can be played on cellular phones, computers and similar communication and computation devices. In this instance, the personalized video may simply be viewed, it may be used as a video ring tone, replacing audio ring tones, or it may be used for virtually any event notification within the context of the use of the device.

(d) Printed holographic images of the type found on debit/credit cards. In this instance, the personalized video no longer exists in a digital image format; it has been transformed into a series of photographic images and embedded into the image sequence within the hologram. In this form the personalized video may be viewed without the use of any electronic viewing device at all.

(e) Digital paper mediums where image and image sequences are electronically or chemically encoded into the potentially non-electronic paper medium.

(f) Digital fabric mediums where fabric for clothing, furniture coverings, and other traditional uses of fabric have had LEDs, OLEDs or other light emitting and transforming technologies embedded into the fabric fibers such that images and animations can be embedded, transmitted or otherwise displayed on the surface of the fabric.

(g) Still image representations such as a single frame from a longer video, and a collage of multiple still images from various sources.

(h) Multiple still image representations placed on a timeline and animated, as is the process for creating Cel animations and the commonly recognized "Monty Python" animations created by Terry Gilliam.

Several digital video formats allow embedding of logic that can be triggered by the playback of a digital video as well as logic that can be triggered by the display of one or more specific frames within a digital video. A Personalized Video can include one or more instances of "ordinary" video receiving one or more modifications; these modifications may include object replacements. With object replacement capability, product placements can be achieved. With the ability to place products into virtually any video, a selection process can occur whereby specific product placements are matched with individual Personalized Video requests. By basing product placement selection upon demographic, similar or other information about the requestor or intended viewer of a Personalized Video, a desirable advertising medium can be realized.

One of technical issues associated with placing a product placement within any Personalized Video is to identify and track one or more specific product placements. This issue can be addressed by using the digital video formats that allow embedding of metadata, user data, logic or other information into a digital video file. A system can be configured to perform one or more of the following operations:

(a) Each Personalized Video, regardless of any specific personalization modifications such as actor replacements or product placements, is assigned a Globally Unique Identifier (GUID).

(b) Each product placement campaign is assigned a separate Globally Unique Identifier (GUID).

(c) When a specific Personalized Video is created, the video's digital file has the GUID associated with the Personalized Video embedded into the file's data such that a logic trigger expressing the GUID will occur every time that digital video file is played;

(d) When a specific Personalized Video is created and that specific Personalized Video receives a product placement, the video frame where the product placement is first visible receives a logic trigger containing the GUID of the product placement and the logical status of "on". When the frame containing the GUID is displayed, the logic trigger expresses the GUID and the logical status "on".

(e) When a specific Personalized Video is created and that specific Personalized Video receives a product placement, the video frame where the product placement is last visible receives a logic trigger containing the GUID of the product placement and the logical status of "off". When the frame containing this GUID is displayed, the logic trigger expresses the GUID and the logical status "off".

(f) Digital video files are commonly played by software; where possible, the software that is playing back a Personalized Video will contain logic that receives or "catches" the logical triggers containing identifying information about which Personalized Video is being played, and which product placements are being viewed.

(g) When a Personalized Video in a digital video file format allowing logical triggers is played and the software has the ability to catch the logical triggers, a series of additional operations can occur, including 1) counting the number of times a video is played, 2) counting the number of times a product placement has been displayed, 3) performing other logic associated with a GUID, such as displaying other information related to the Personalized Video or product placement within the playback device, 4) transmitting this information to a remote database that is monitoring all instances of playback of this Personalized Video and/or instances of any product placements, 5) storing of information for later transmission to a remote database that is monitoring all instances of playback of this Personalized Video and/or instances of any product placements.

In some instances, it may be desirable for such logic to be embedded into a personalized video such that a counter is incremented each time the video is played. Similarly, a logical trigger may be embedded into a personalized video that is triggered when a specific product image, a logo, or other image is displayed. The counter may be located on the Internet, and/or on the device where the personalized video is viewed. When a counter is not located on the Internet, but on the viewing device, some means of transmitting the counter value to those interested in these values may be employed, such as the next time the device is attached to the Internet for retrieval of a new video or other information.

Description of Processes

The process steps applied to the video involve altering or manipulating the actual data stored in the digital video on a pixel-by-pixel and frame-by-frame basis. To avoid excessive repetition of this concept throughout this description, process steps are herein described in terms of an action and the portion of the image that is involved. For example, a step described as "replacing an original object with a new object" does not actually involve the objects themselves, but rather the images of the objects as depicted in the video. The act of "replacing" may involve identifying all pixels within each video frame that represent an image of the original object to be replaced, and then changing the digital data for those pixels in a two step process: 1) overwrite the original object with pixels that represent the background behind the object, and 2) overwrite the new background replaced image with the image of the new object. The data may be changed in a single step by overwriting the original data with the new data. The two step process is employed when the shape of the replacing object has the potential to be different than the original object. The steps of identifying and changing are then repeated for every frame of the video.

The initial description of the processes will be made using an example case where the video is personalized by substituting the image of the face of a new actor for the facial portion of the image of one of the video's original actors. Within this specification, the terms face and facial should be interpreted to include the visible portions of the ears, neck, and other adjacent skin areas unless otherwise noted. The same processes can be applied to substituting a larger portion of the new actor for the corresponding portion of the original actor, up to and including full-body substitution. The same basic processes can be applied across the range of possibilities, with increased processing complexity, time, and cost as the portion of the video being substituted increases. Likewise, this same basic process may be performed upon multiple original actors in a video, resulting in a personalized video that depicts multiple new actors. Furthermore, a variation of this same process may be employed that replaces objects and/or set pieces in the video rather than single or multiple actors.

FIG. 1 is a flow chart of a process to create a video that has been personalized by way of substituting the image of the face of a new actor for at least part of the facial image of one of the video's original actors. The new actor may be the individual desiring the personalized video, a friend or family member thereof, or any other individual, real or imagined, so long as at least one 2D image can be provided.

The process depicted in FIG. 1 is divided into an actor modeling process 100, a video preparation process 200, and a personalization process 300. Note that process 100 and 200 are independent of each other. The personalization process 300 requires the results of both a prepared video (process 200) and at least one new actor model (process 100). For any specific video, process 200 must be performed. For any specific personalized video, the result of process 200 is paired with at least one result from process 100, and together they are passed through process 300 to create a personalized video. Process 200 needs only to be executed once per video. Process 100 needs only to be used once per new actor. Therefore, once a video has been prepared by process 200 it may be paired with any number of new actor models to create a personalized version of that video with that actor. Likewise, once an actor model has been created with process 100, it may be pared with any number of prepared videos to create different personalized videos featuring that actor. Furthermore, the demographic profile collected by process 100 contains information that allows non-actor replaced personalized videos to be created, such as the previously described local neighborhood pizza franchise personalization.

The video preparation process 200 and the personalization process 300 may be performed almost concurrently, with the limitation that the video preparation process on each video frame may need to be completed before the personalization process is applied to the same frame. However, process 200 may be a human, labor intensive process that may require an extended period of time to complete. In practice process 200 may be required to be completed before process 300 can begin.

In FIG. 1 and subsequent figures, reference designators between 101 and 199 indicate process steps within the actor modeling process 100. Additionally, a letter suffix will be added to the reference designator 100 (100A, 100B, etc.) to indicate optional expansion of the actor modeling process 100. Similar conventions will be followed for the video preparation process 200 and the personalization process 300.

The actor modeling process 100 accepts one or more two-dimensional (2D) digital images of the new actor, plus related supporting information, and creates, at step 110, a digital model of the new actor composed of a three-dimensional model and, optionally, a demographic profile and other personal information describing the new actor. The preferred 2D image primarily captures the new actor's face, the top and bottom of their head, both ears, portions of their neck, with both eyes visible and no more than a 30 degree rotation away from the camera. Where portions of the face or head may be occluded due to rotation away from the camera, potentially in excess of 30 degrees, statistical reference may be used to supply the information that can not be recovered from analysis of the photographic images. Technology to create a 3D model from a 2D image is known and is an offshoot of the computer vision field as well as facial recognition technology common to security systems. The minimum related supporting information is simply a name for the resulting new actor model. Additional related supporting information may include a demographic profile and/or other personal information describing the new actor. This information may be gained by simply requesting the information from the user, and/or determining information via a demographic information subscription service, and/or tracking and retaining such information by observing the user's activity when using personal media services.

The video preparation process 200 begins at step 210 where the position, orientation, and expression of an original actor is identified and tracked. This step develops and saves additional data for each frame of the video. This data may include the position of the original actor's face within the video frame and relative size within the coordinate space of a simulated digital camera viewing the scene, the actor's facial expression quantified according to some set of metrics, and the original actor's orientation, or relative head rotation and tilt. The facial position tracking and orientation estimation may be done by a digital artist aided by automated image processing tools. The original actor's expression may be quantified by geometric morphing or transforming a reference 3D model of the original or similar actor's head to match the expression in the video image. A similar transformation may subsequently be applied at step 320 to transform a 3D model of the new actor's head to cause the image of the new actor to match the original actor's expression.

In the case where a collage technique is used to create the video, the different visual elements that compose the video are integrated just prior to step 210. Compositing the multiple elements prior to step 210 provide the position, orientation and expression of the original actor for step 210's identification and tracking. Note that the collage technique can include an "implied" original actor, where a faceless body is created by compositing and animating body parts frame-to-frame similar to "Monty Python" style animations; in this situation, step 210 can be used to provide the "created character" with frame-to-frame facial orientations and expressions where no real original actor's facial orientation and expression existed.

Given the natural variability in the size of ears, noses, and other facial features, it is possible that the face of the new actor will not be an exact replacement for the face of the original actor. In many cases, simply placing the image of the new actor over the existing image may leave some residual pixels of the original actor's face visible. Residual pixels may distort the image of the new actor's face and may be particularly objectionable if there is a significant difference in skin tone between the original and new actors. It may be possible to detect and eliminate residual pixels currently with the insertion of the image of the new actor in each video frame. However, since the number and location of the residual pixels will be dependent on the features and physical size of the new actor, such a process may have to be repeated each time the video is personalized for a different new actor.

To ensure complete removal of the facial image of the original actor without the possibility of residual pixels, the video preparation process 200 may continue at step 220 where at least the key portions of the image of the original actor are removed and replaced by an image that continues the background behind the actor. In the case of a video created with the intention of personalization, the background image may be provided simply by recording the scene without the original actor. In the case of an existing video, the background in the image area where the facial image of the original actor has been removed may be continued from the surrounding scene by a digital artist assisted by automated video processing tools. In the case of a collage technique where different visual elements are combined in the image plane and potentially animated for effect, step 220 may not be needed at all. When step 220 is used, removing the facial image of the original actor and backfilling with a continuation of the background scene prepares the video for use with a plurality of different new actors without additional processing to remove residual pixels.

The key portions of the original actor replaced at step 220 may include the face and adjacent skin areas. Optionally, the key portions may include hair, clothing, or additional portions up to and including the entire actor. If necessary to achieve the proper illusion, the shadow and reflections of the actor may also be removed and replaced. Often a shadow of an actor is diffuse and reflective surfaces are sufficiently dull that replacement is not required. However, when sharp shadows or highly polished reflective surfaces are present, the shadows or reflections do need to be replaced at step 220. The result of step 220 becomes the background images used for process 300. Step 220 creates the background images that all further personalized imagery is placed over. Where step 220 is not used, the background images for all further personalized imagery is simply the images after step 210.

The video may include visible skin areas of the original actor, such one or both hands or arms, that will not be replaced by the background image or the new actor. At step 230, visible non-replaced skin areas of the original actor may be identified, possibly by a digital artist with the assistance of automated image processing tools. The non-replaced skin areas may be identified by simply locating pixels having the appropriate coloration for the original actor's skin. Data defining the location and extent of the non-replaced skin areas may be developed and saved for each frame of the video. Step 230 may create another series of frames that is skin only, with a matte background that allows this skin only frame set to be composited over the result of step 220. Steps 220 and 230 as well as 320 and 330 may occur in the reverse order from that depicted in FIG. 1.

Each frame of the video is a 2D image of a 3D scene. Illumination, shading, shadows, and reflections are important visual cues that relate the depth of the scene to the viewer. Any portion of the image that is substituted without recreating the proper illumination, shading, shadow and reflection effects may be immediately recognized as false or fake.

Thus the video preparation process may continue at step 240 with the identification and tracking of illumination, shading, shadows, and reflections that exist due to the presence of the original actor in the scene. In order to accurately recreate these effects in substituted portions of the image, it is necessary to develop or estimate data that defines at least one of the following parameters: the position of the camera with respect to the scene; the number, type, intensity, color and location of the light source or sources with respect to the scene and the camera; the relative depth of objects within the scene; and the nature, relative position, and angle of any visible shadow receiving and reflective surfaces. In the case of a video recorded with the intention of personalization, much of this data may simply be measured and documented while the video is created. In the case of an existing video, this data may be estimated from the image by a digital artist assisted by automated video processing tools. In the case of collage style video, where the scene is a composite of multiple disparate elements, step 240 may be 1) omitted, or 2) a digital artist may use step 240 to create new visual elements that integrate the multiple disparate elements into the appearance of a physical location.

Within the video preparation process 200, the steps 210, 220, 230, and 240 may be done in any order by multiple digital artists performing these steps with multiple copies of the images that compose the digital video. Note that the video preparation process 200 does not require any information or data on the new actor. Thus the video preparation process need only be done once on each video if the data developed at steps 210, 220, 230, and 240 is stored. This data is stored as a series of companion files to the video.

Figure 2:
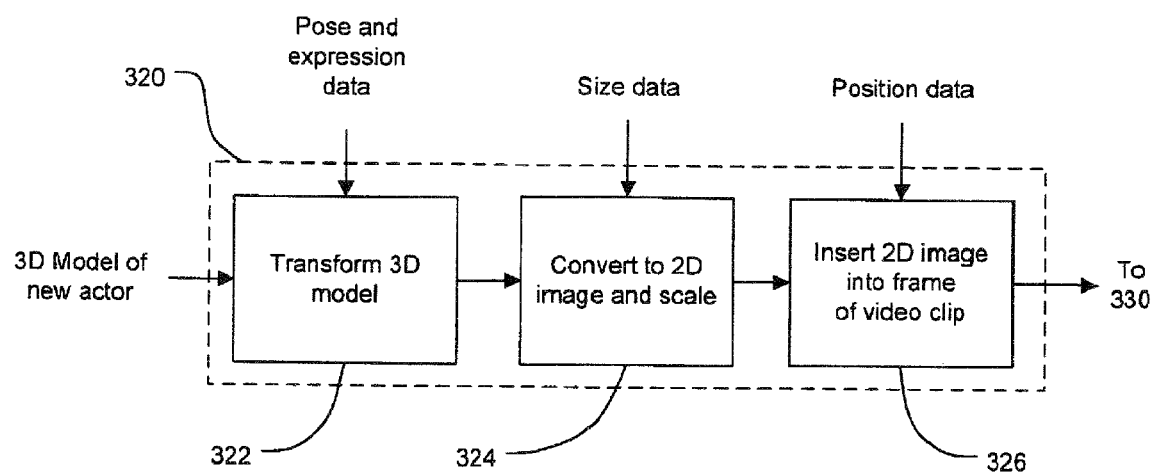
FIG. 2 is an expansion of the process of FIG. 1.

The personalization process begins at step 320 where the image of the new actor is inserted into the video. The process for substituting the image of the new actor is show in additional detail in FIG. 2. At step 322, the 3D model of the new actor may be transformed to match the orientation and expression of the original actor as defined by data from step 210 of the video preparation process. This transformation may involve both rotation on several axis and geometric morphing of the facial expression, in either order. After the 3D model is rotated and morphed, a 2D image of the 3D model is developed and scaled to the appropriate size at step 324. The transformed scaled 2D image of the new actor is then inserted into the video at step 326 such that the position, orientation, and expression of the new actor substantially matches the position, orientation, and expression of the previously removed original actor. In this context, a "substantial match" occurs when the personalized video presents a convincing illusion that the new actor was actually present when the video was created.

Referring again to FIG. 1, at step 330 the visible non-replaced skin areas of the original actor are altered to match the skin appearance of the new actor. Skin appearance may include factors such as color, tone, and texture. This alteration may be done such that the average skin tone of the non-replaced areas, after alteration, is the same as the average skin tone of the facial areas of the new actor, while preserving variations present in the original image.

At step 340, the illumination, shading, shadows, and reflections present in the original video are recreated. This process may include recreating illumination highlights and shading on the new actor or other replaced areas of the image, as well as recreating or altering any shadows or reflections of the new actor. Thus step 340 is preferably performed as the final step of the personalization process.

Figure 3:
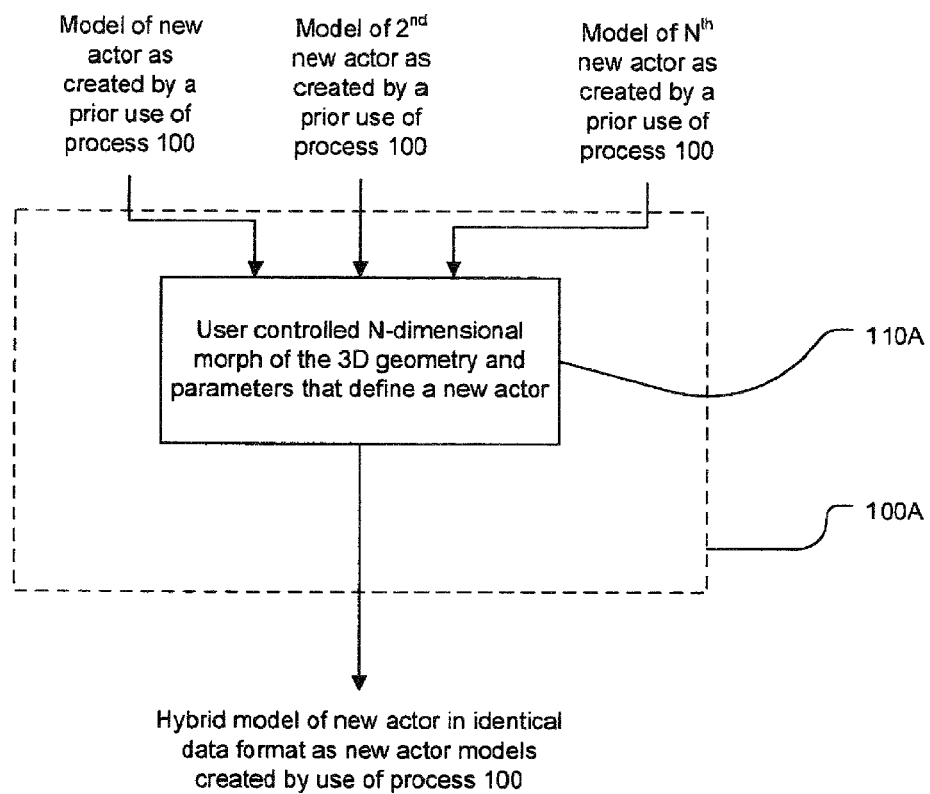
FIG. 3 is a flow chart of optional steps in the process to create a personalized video.

FIG. 3 is a flow chart of an optional process 100A that may be used to create hybrid new actor models that are a composite of the parameters that define a new actor. Each new actor model is composed of a three-dimensional geometry, a demographic profile and additional personal information, such as age, sex, body type and so forth. Every new actor model is retained in a data format that is substantially similar to every other new actor model. This allows any number of new actors to be selected by a user and a user controlled N-dimensional transformation and morph performed. The combination and parameter morphing process 110A allows a user to select any number of new actor models they possess, and create new hybrid actor models that are the result of a combination or transformation of any and/or all the parameters that define a new actor. This allows an individual to select as inputs a new actor depicting themselves and their same sex parent, and via morphing the three-dimensional geometry and age parameters, create a version of themselves older, or their same sex parent younger. Likewise, this process can be used to create fantasy offspring between themselves and celebrities or other possible hybrid combinations.

It may be desirable to add the image of an object into a personalized video, or to replace the image of an existing object with a different object. For example, a piece of sporting equipment might be inserted to further personalize a video for an avid sports fan. Alternatively, an object may be placed or replaced in a personalized video to provide personalized targeted advertising. Similarly, the object may be selected to celebrate a particular holiday, season, or event. The object to be added or substituted into a video may be selected based on demographic information of the new actor, or other information related or unrelated to the new actor.

Figure 4:
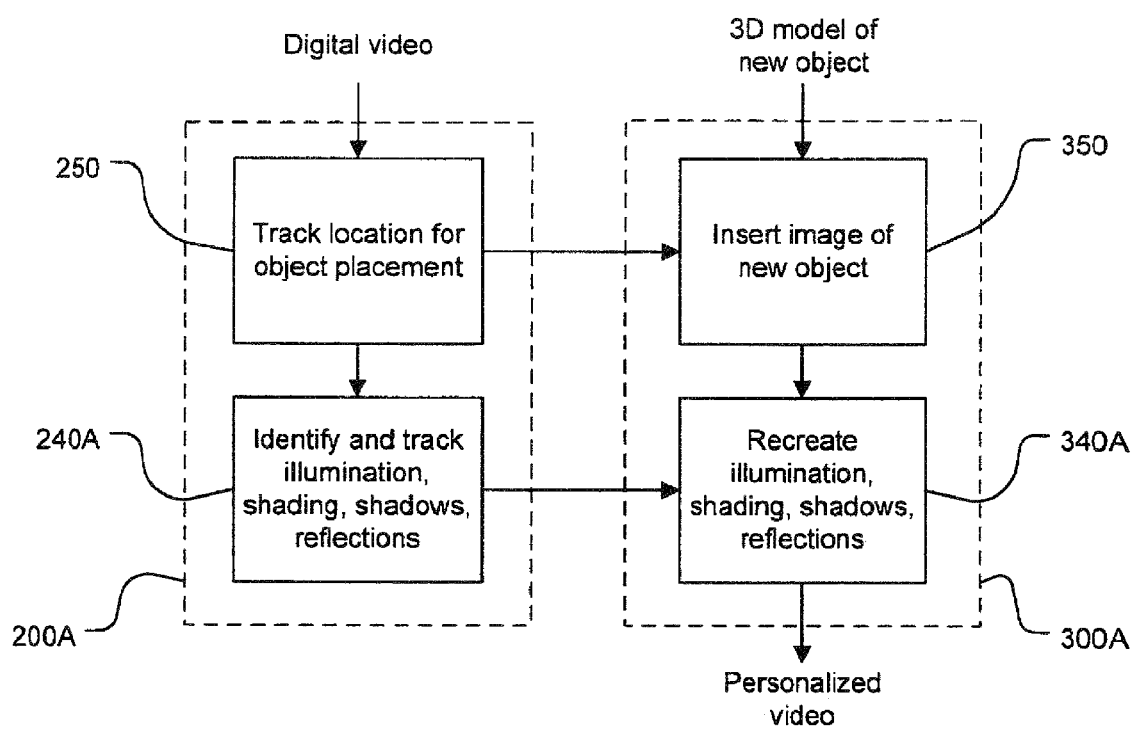
FIG. 4 is a flow chart of optional steps in the process to create a personalized video.

FIG. 4 is a flow chart of optional processes 200A and 300A which may be incorporated into the video preparation process 200 and the personalization process 300, respectively to place a new object in a video. At step 250, an object placement location suitable for placing an object is identified and tracked through the frames of the video. For example, the object placement location may be a top of a table or an open space on a floor. There may be one such location, no locations, or multiple locations identified and tracked in a specific video. Tracking the object placement location may be trivial if the location is stationary with respect to the real or simulated camera viewing the scene, and if no actor or other scene element moves between the object placement location and the camera. Tracking the object placement location is more complex if the camera moves with respect to the scene or if the object placement location itself moves, such as within an actor's grasp, with respect to the scene.

The image of a new object is added to the scene at step 350. The process at step 350 is similar to the process previously described for step 320, without the need to morph the expression of the new object. A 3D model of the new object is rotated as needed to match the camera angle and scaled to an appropriate size. A 2D image is then developed from the rotated scaled 3D model and inserted into the video image.

Steps 240A and 340A are essentially a continuation and expansion of steps 240 and 340, except that steps 240A and 340A are concerned with the effect of illumination, shading, and shadows on the image of the new object as well as shadows and reflections of the new object. At step 240A, data that defines at least one of the following parameters will be developed: the position of the camera with respect to the new object; the number, type, intensity, color and location of the light source or sources with respect to the new object and the camera; the relative depth of the new object within the scene; and the nature, relative position, and angle of any visible shadow receiving and/or reflective surfaces. In the case of a video created with the intention of personalization, much of this data may simply be measured and documented while the video is created. In the case of an existing video, this data may be estimated from the image by a digital artist assisted by automated video processing tools. In the case of collage style video, where the scene is a composite of multiple disparate elements, step 240A may be 1) omitted, or 2) a digital artist may use step 240A to create new visual elements that integrate the new object and the multiple disparate elements into the appearance of the new object's presence in the simulated physical location.

At step 340A, the illumination, shading, shadows, and reflections consistent with the original video will be added. This process may include creating illumination and shading effects on the new object, as well as creating or altering any shadows or reflections of the new object. Step 340A may be performed with step 340 as the final steps of the personalization process.

Figure 5:
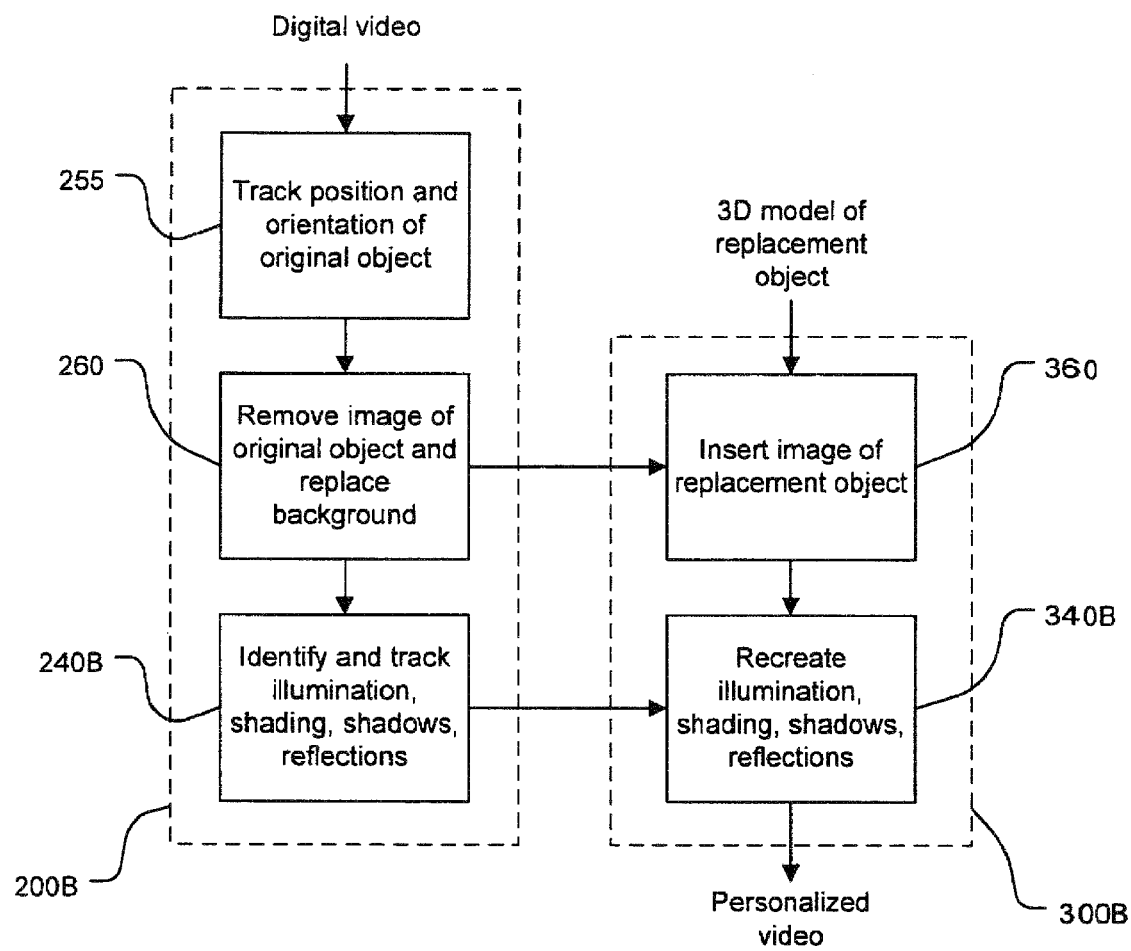
FIG. 5 is a flow chart of optional steps in the process to create a personalized video.

FIG. 5 is a flow chart of optional processes 200B and 300B which may be incorporated into the video preparation process 200 and the personalization process 300, respectively to replace an original object with a replacement object in a video. At step 255, an original object is identified and the position and orientation of the original object tracked through the frames of the video. For example, the original object might be a beverage can or a cereal box on top of a table. There may be one original object, no original objects, or multiple original objects identified and tracked in specific video. Tracking the original object may be trivial if the position of the original object is stationary with respect to the real or simulated camera viewing the scene, and if no actor or other scene element moves between the original object and the camera. Tracking the original position and orientation will be more complex if the camera moves with respect to the original object or if the original object itself moves with respect to the scene.

The replacement of an original object with a smaller replacement object may result in residual pixels, as was previously discussed for the replacement of actor's faces. To prevent residual pixels, the video preparation process 200B may continue at step 260 where at least a portion of the image of the original object is removed and replaced by an image that continues the background scene behind the original object. In the case of a video created with the intention of personalization, the background image may be provided simply by creating a version of the scene without the original object. In the case of an existing video, the background scene may be continued from the surrounding scene by a digital artist assisted by automated video processing tools. In the case of collage style video, where the scene is a composite of multiple disparate elements, step 260 may be 1) omitted, or 2) a digital artist may use step 260 to create new visual elements that integrate the new object and the multiple disparate elements into the appearance of the new object's presence in the simulated physical location. Removing the image of the original object and backfilling with the background prepares the video for use with a plurality of different replacement objects without additional processing to remove residual pixels. The process of step 260 may not be required in certain cases, such as the replacement of one 12 ounce standard beverage can with a different standard beverage can.

The image of a replacement object is added to the scene at step 360 using a process that may be essentially the same as that described for step 350. A 3D model of the replacement object may be rotated as needed to match the orientation of the original object and scaled to an appropriate size. A 2D image may then be developed from the rotated scaled 3D model and inserted into the video image.

Steps 240B and 340B may be essentially a continuation and expansion of steps 240 and 340, except that steps 240B and 340B are concerned with the effect of illumination, shading, and shadows on the image of the new object as well as shadows and reflections of the new object. At step 240B, data that defines at least one of the following parameters may be developed: the position of the camera with respect to the new object; the number, type, intensity, color and location of the light source or sources with respect to the new object and the camera; the relative depth of the new object within the scene; and the nature, relative position, and angle of any visible shadow receiving and reflective surfaces. In the case of a video created with the intention of personalization, much of this data may simply be measured and documented while the video is created. In the case of an existing video, this data may be estimated from the image by a digital artist assisted by automated video processing tools. In the case of collage style video, where the scene is a composite of multiple disparate elements, step 240B may be 1) omitted, or 2) a digital artist may use step 240B to create new visual elements that integrate the replacement object and the multiple disparate elements into the appearance of the replacement object's presence in the simulated physical location.

At step 340B, the illumination, shading, shadows, and reflections consistent with the original video will be added. This process may include creating shadows that fall across the image of the new object, as well as creating or altering any shadows or reflections of the new object. Step 340B may be performed with step 340 as the final steps of the personalization process.

It may be desirable to replace the background of the scene, or the "set" where the video occurs, with a different background that depicts a location related to the new actor's own location, a location that closer matches the new actor's demographic profile, or some other location. For example, the original video may occur at a restaurant, but after personalization the restaurant background may be replaced with a similar restaurant containing the logos and identifying characteristics of a specific restaurant and/or restaurant chain, or even a specific restaurant located near the new actor's current location. Similarly, it may be desired to replace the background scene with a scene that is closely related to a new objected inserted or substituted into the video.

Figure 6:
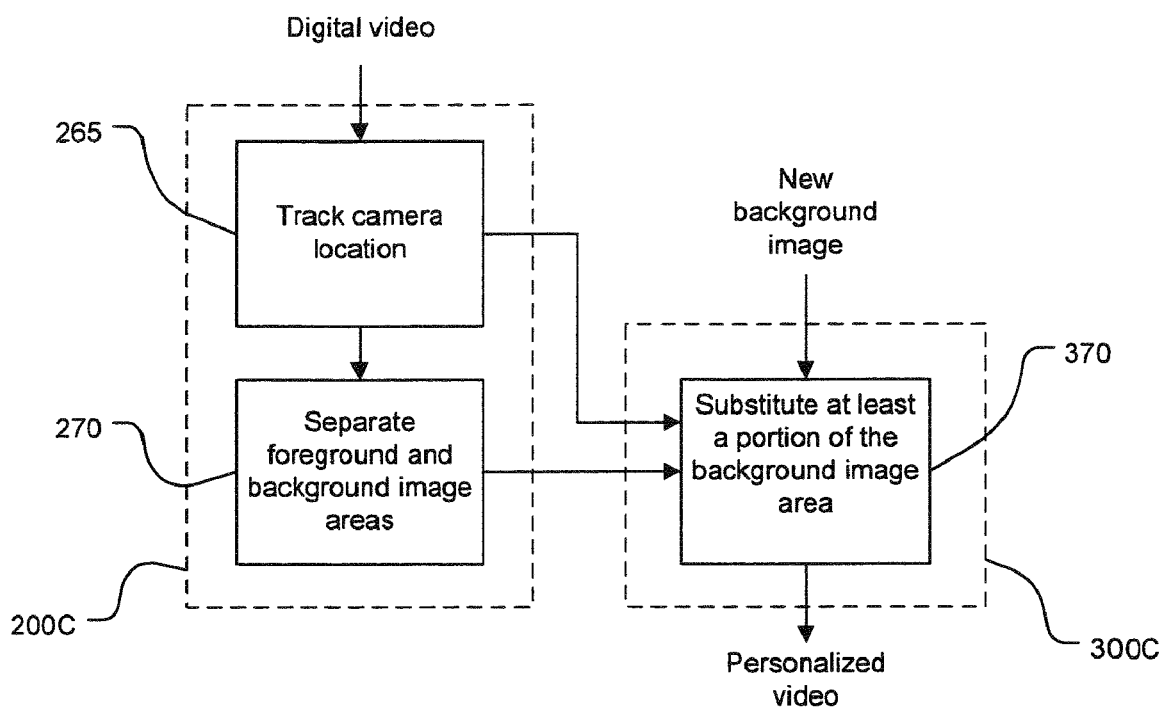
FIG. 6 is a flow chart of optional steps in the process to create a personalized video.

FIG. 6 is a flow chart of optional processes 200C and 300C which may be incorporated into the video preparation process 200 and the personalization process 300, respectively to replace at least a portion of the original background scene with a new background scene. At step 270, the video image may be divided into separate foreground and background scene areas. The background scene is generally the part of the image furthest from the camera, it may be a planar surface or backdrop or it may be more complex, requiring one or more 3D models to simulate the visual appearance of the new background. The foreground image areas are generally anything in front of the plane of the background, and may contain the actor or actors, any objects that may be replaced, and/or any locations where new objects may be inserted into the image. For videos created specifically for personalization, the foreground/background separation can be accomplished by recording the background scene with the actors and foreground objects removed, or by the known technique of recording the scene against a uniform "green screen" background such that the background location and environment can be inserted after the scene is recorded. In the case of an existing video, the background and foreground image areas may be separated by a digital artist assisted by automated video processing tools. In the case of collage style video, the background may already be a separate visual element that is easily replaced with other background visual elements. When a collage style video does not have the background as a separate visual element, it is treated the same as existing video and the foreground and background may be separated by digital artists assisted by automated video processing tools.

At step 265, which may occur before or after step 270, the camera location is determined and recorded. For videos created specifically for personalization, the scene may be recorded with camera motion under computer control such that the focal length and position of the camera at each frame is retained. This method is known and used to integrate computer graphics into video recordings. In the case of videos created for personalization via three-dimensional animation systems, where no "recording" of physical objects takes place, the focal length and position of the synthetic digital camera is also similarly retained, allowing the resulting digital video to be handled identical to recorded videos. In the case of existing videos, computer vision analysis may be used to recover the location of the camera as it originally viewed the scene. In the case of collage style video, the camera location and related information is estimated for effect, since collage style video by nature is the result of many different camera views haphazardly composited together.

At step 370, at least a portion of the original background scene may be replaced with a new background scene. The new background scene must be placed "behind" the foreground image areas, and must be placed under any shadows cast by the foreground actors and objects.

After the image of an original actor has been replaced with the image of a new actor, it may also be desired to modify or replace the dialog of the new actor to closer approximate the characteristic voice quality of the replacing individual. Replacing the dialog may be as simple as recording the new actor speaking in synchronism with the video. However, it may be desired to modify the original dialog to resemble the voice of the new actor without the possibility of the new actor changing the wording or content of the dialog. Additionally it may be desired to modify or replace a non-dialogue background audio element with a replacement element that closer matches the environment or location of the new actor. For example, it may be appropriate to replace the sound of a police siren from the United States with that of a police siren from the United Kingdom, if the new actor is located in the United Kingdom. At least some background audio elements may be replaced such that the characteristic audio background of the original video is replaced with a characteristic audio background appropriate to the new actor.

Figure 7:
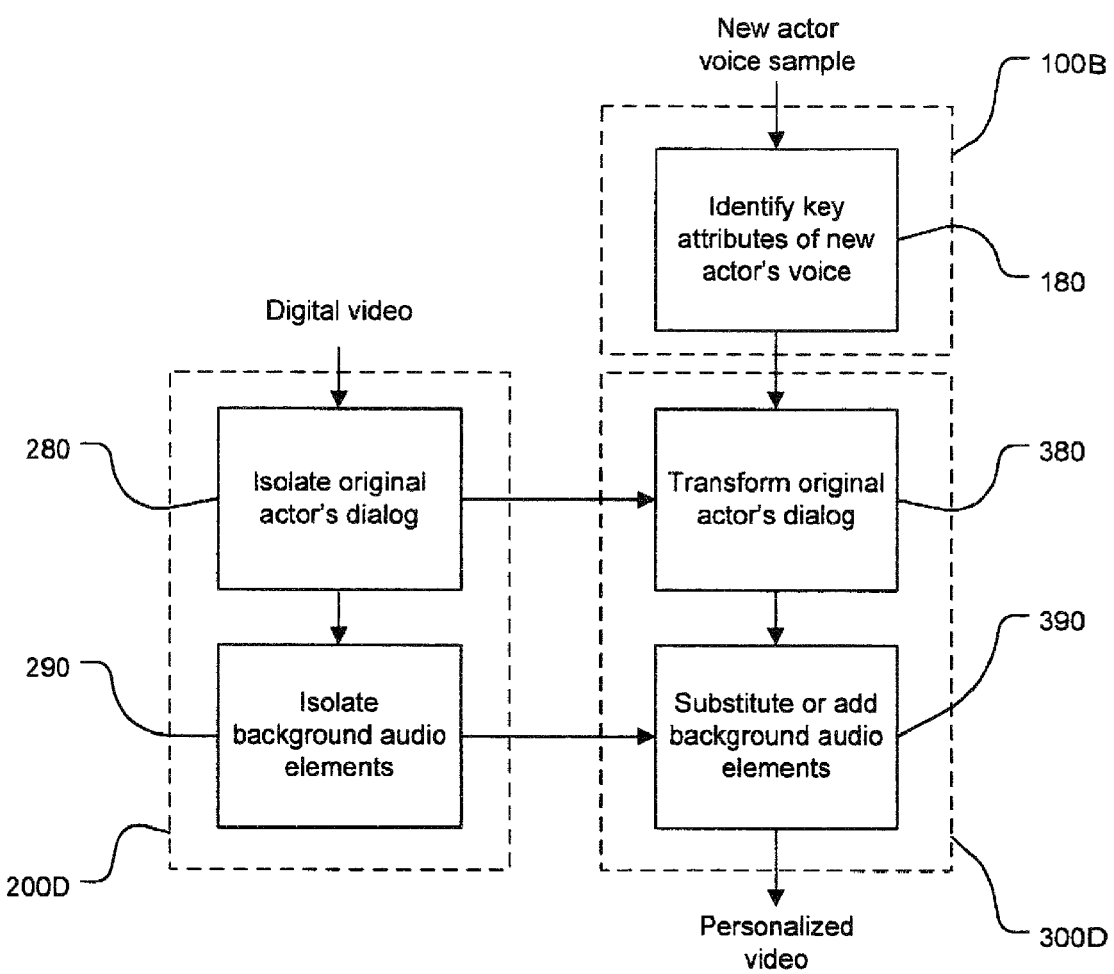
FIG. 7 is a flow chart of optional steps in the process to create a personalized video.

FIG. 7 is a flow chart of optional processes 100B, 200D, and 300D which may be incorporated into the actor modeling process 100, the video preparation process 200 and the personalization process 300, respectively, to modify or replace the original actor's dialog or a background audio element. At steps 280 and 290, the video soundtrack is analyzed to isolate the original actor's dialog and to isolate background audio elements for replacement or modification. A digital artist, a software process, or a combination of the two may examine the soundtrack of the original video, and identify the individual tracks and sound elements that compose the soundtrack. In some instances of professionally produced video as well as video produced for personalization, the individual audio elements of the video are available, and process 200D becomes simply identification and retrieval of the audio elements from the producers of the video.

At step 180, a new actor voice sample is received and analyzed using known techniques to extract at least one key attribute that characterizes the new actor's voice. The key attribute may be pitch, harmonic content, or other attribute. The original actor's dialog is transformed to match the at least one key attribute of the new actor's voice at step 380, such that the transformed dialogue sounds as if it were spoken by the replacing individual.

Background audio elements isolated at step 290 may be modified or replaced at step 390. Additional audio elements may also be added a step 390. The dialog modification process (steps 180, 280, 380) and the background audio modification process (steps 290 and 390) are relatively independent and either can be done without the other.

As previously mentioned, the replacement of an original actor may be carried to an extreme such that the original actor is completely removed from the original video, their key motions retained, and a complete digital reconstruction of a new actor may substituted in the original actor's place, with the essential frame to frame body positions, facial expressions, environmental lighting and shading influences upon both the inserted human form and the scene recreated. In this case, motion information, such as a reference video or 3D motion capture data, may be collected on the new actor such that the image of the new actor substituted into the video has the new actor's characteristic expressions, walk, run, standing posture or other individual traits.

Figure 8:
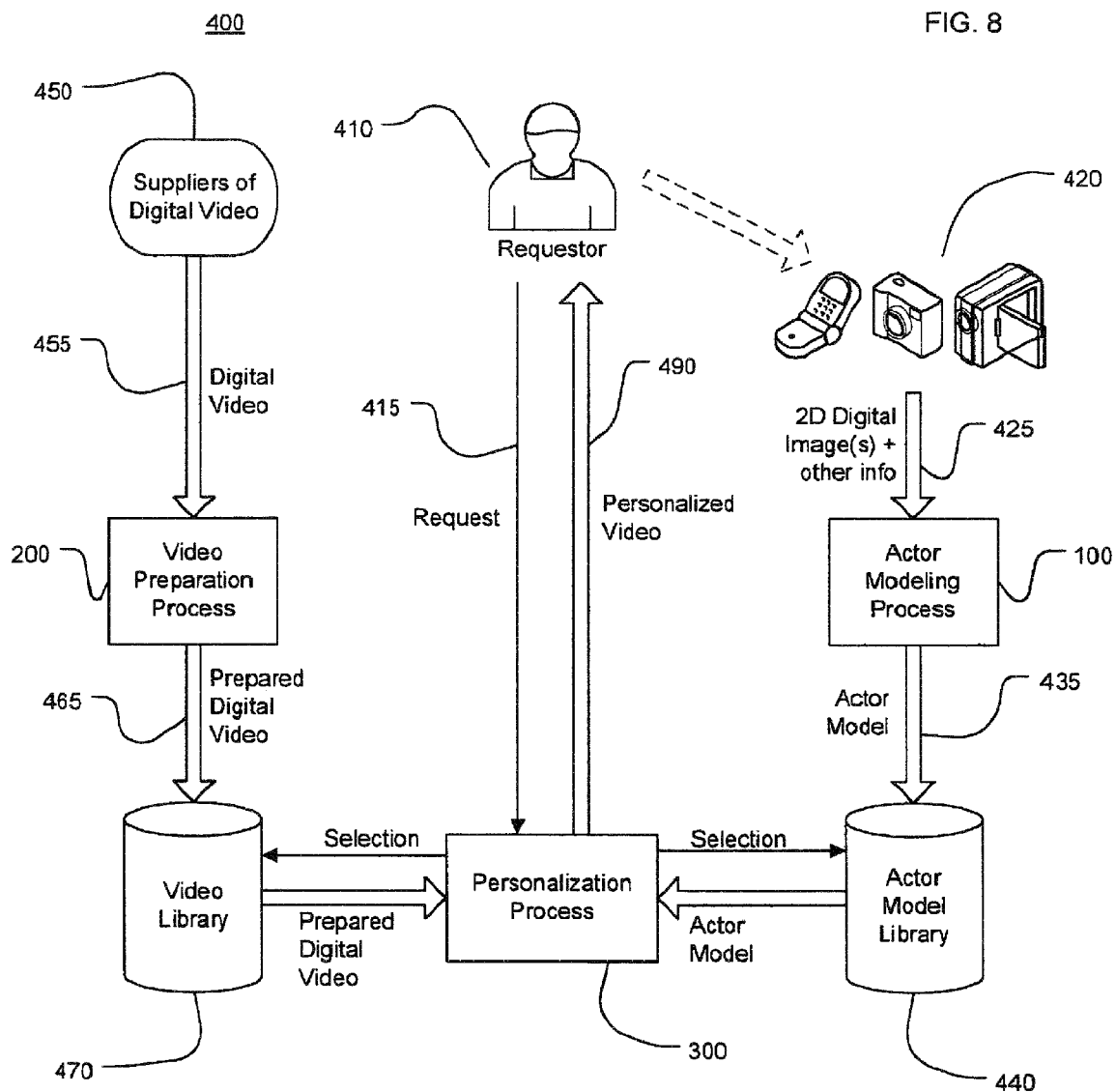
FIG. 8 is a flow chart of another process for providing personalized videos.

FIG. 8 shows a flow chart of a process 400 for creating and delivering personalized video. The video preparation process 200, comprising previously described steps 210, 220, 230, and 240, and optionally steps 250, 240A, 255, 260, 240B, 265, 270, 280, and/or 290, may be completed without any advance knowledge of any new actor images, new object images and/or new background images that will be substituted or inserted into a video. An original digital video 455 may be obtained from a supplier of video 450. The original digital video 455 may be delivered to the video preparation process 200 on a digital storage medium such as a compact disc or diskette, by means of a network such as the Internet or a local area network. The original digital video 455 may be processed by the video preparation process 200 and the resulting prepared digital video 465 may be saved in a video library 470 containing at least one video that is ready for personalization.

Similarly, the actor modeling process 100, comprising steps 110 and optionally steps 120, 130 and/or 180, can be completed without knowledge of the video into which the image of the new actor will be placed. A 2D digital image and other information 425 is received and processed by the actor modeling process 100, resulting in an actor model 435. The 2D digital image 425 may be created by means of a digital image recording device 420, such as a digital camera, a digital video recorder, or a camera-equipped cell phone. The 2D digital image 425 may also be obtained by scanning a conventional photograph. The 2D digital image 425 may be delivered to the actor modeling process 100 on a digital storage medium such as a compact disc or diskette, by means of a network such as the Internet or a local area network. The 2D digital image 425 may be accompanied by a name or identifier that will be used to reference the image for later personalization requests. The 2D digital image 425 may be accompanied by addition optional information including, but not limited to the sex, height, weight, age, general body shape and/or other physical characteristics of the individual shown in the image; the general location of this individual, such as their zip code, country of location, nationality or similar; and/or an audio sample of the individual speaking a random or a specific series of words.

The actor model may be delivered to the personalization process 300 directly, or may be saved in an actor model library 440.

The requestor of the personalized video 410 transmits a request 415 to the personalization process. The requestor 410 may or may not be the new actor whose image will be substituted into the video, the requestor 410 may or may not be the party taking delivery of the personalized video 490, and the requestor may not necessarily be a human user, but some other unspecified software or other process. The request 415 may be delivered via the Internet or some other network, or may be delivered by other means such as facsimile, phone or mail. The request may identify a specific video to be retrieved from the video library 470. The request may identify an actor model to be retrieved from the actor model library 440. The request may include a 2D digital image 425, in which case the actor modeling process 100 will be performed on the image prior to the personalization process 300. The personalization process 300 retrieves the selected prepared digital video and the 3D actor model and performs the requested personalization. The completed personalized video 490 may be delivered to the requestor 410 or some other party by means of a network such as the Internet, or may be delivered on a storage medium such as a compact disc or digital video disc.

The personalization process 300 may include optional personalization steps including creating a composite and/or age-transformed new actor model, replacement or addition of one or more objects, replacement of at least a part of the background scene, modification of dialog, and/or modification or addition of background sound elements. The optional personalization steps may be done in response to a request from the requestor 410 or from another party such as an advertiser, or may be selected automatically based on demographic information on the requester or the selected new actor.

The process 400 for creating and delivering personalized videos may be implemented as one or more web site interfaces on the Internet. These web site interfaces may be accessed via computers, cellular phones, PDAs or any other current or future device with Internet browsing capability. The process 400 may be part of an online store, club or other association that allows individual members to create, view, purchase or receive personalized videos for entertainment, reference or education. The process 400 may be part of a fund raising web site offering personalized videos for download and/or online viewing as an incentive to donate to a charity, and/or political campaigns and issues.

Figure 9:
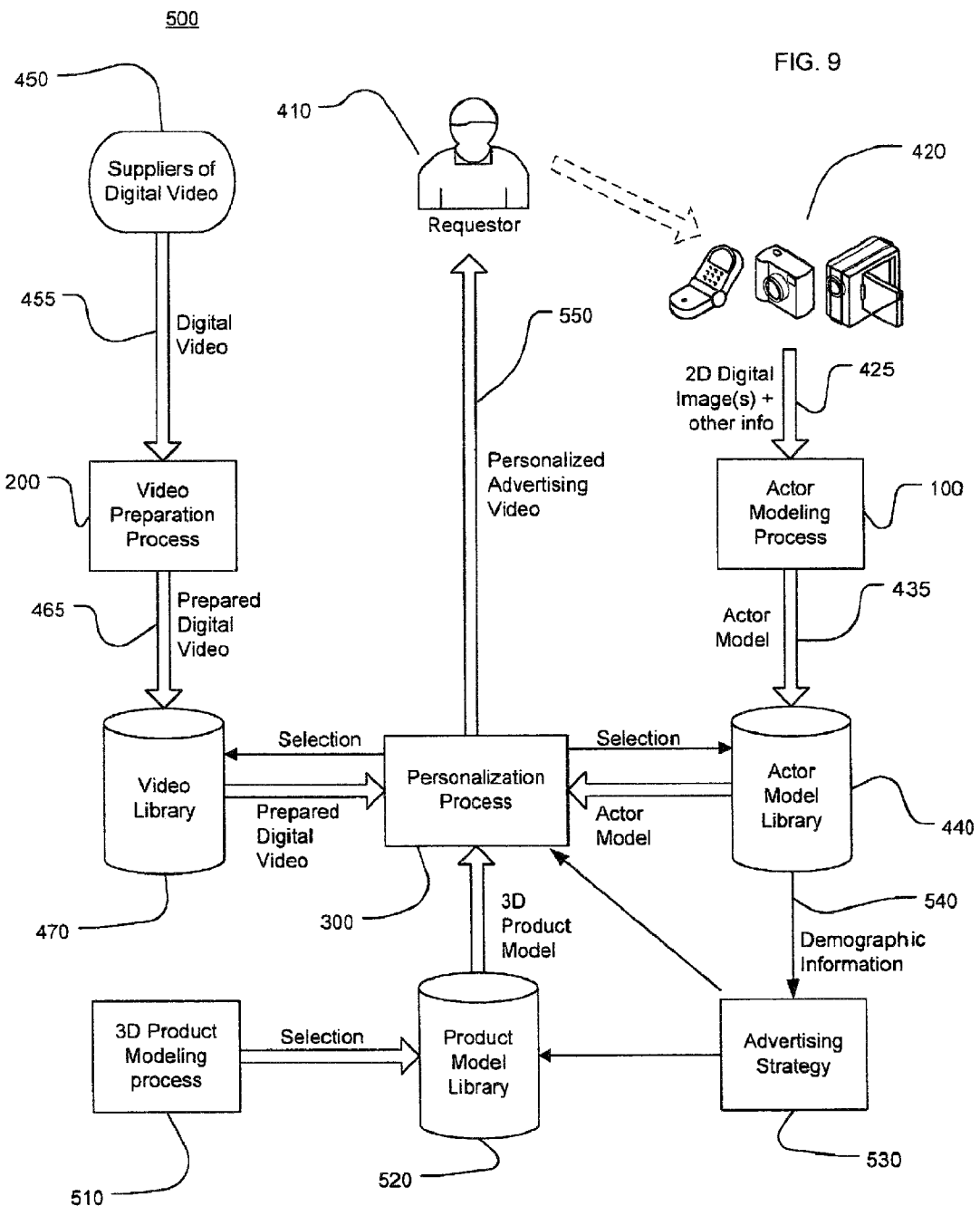
FIG. 9 is a flow chart of a process for providing personalized advertising.

FIG. 9 is a flow chart of another process 500 for creating personalized videos. The process 500 is similar to the process 400 described in FIG. 8, with the addition of a 3D product modeling process 510, a product model library 520, and an advertising strategy process 530. Demographic information 540 on the new actor or the requestor is provided to the advertising strategy process 530, where decisions are made on the selection of one or more products from the product model library 520 that will be inserted or substituted in the personalized video. The process 500 for creating and delivering personalized videos may be implemented as one or more web site interfaces on the Internet. These web site interfaces may be accessed via computers, cellular phones, PDAs or any other current or future device with Internet browsing capability. The process 500 may be part of an on-line advertising promotion such as providing a potential customer with a video of them using the advertiser's product. Likewise, the process 500 may be transparently inserted into an on-line advertising campaign such that individuals browsing Internet web sites may receive, without specific request, personalized video advertisements, and/or individuals requesting on-demand video entertainment through their cellular phone, cable set-top box or other on-demand entertainment device may receive personalized video advertisements within their on-demand video requests.

Therefore, in one implementation, Personalized Video is a series of processes that treat individual elements within a digital video as independent elements and allow for insertion, removal and modification of one or more of such independent elements. These elements may be visual or audio in nature and may exist over a span of video frames and time. When a specific element is inserted, removed and/or modified, additional processes may be employed that allow the tracking and identification of the insertion, removal and/or modification. Furthermore, due to the ability of the personalization process to radically alter an original video, the same or similar processes as employed to track and identify element insertion, removal and/or modification can be used to track and identify the original video that was the basis of any specific personalized video.

The above processes can be used to produce personalized video in a file format allowing metadata, user data, logic or other information to be embedded into the file along with GUIDs that allow tracking. The embedded GUIDs enable a database to be created that uses the GUIDs of every original personalized video as well as every product placement campaign as a look up key to gain information or update information about that personalized video or product placement campaign.

When a Personalized Video is encoded in a digital video format allowing metadata, user data or other information, the overall process of embedding tracking information into a Personalized Video can operate with various steps that use the following information: A) the GUID associated with the original unaltered video that became the basis of the Personalized Video; B) the GUID of this specific Personalized Video now being encoded; C) the GUIDs of any product placements or any other personalization modifications being tracked. Given this information and an appropriate digital video format, the steps to embed tracking information into a Personalized Video can include the following:
 a. create a GUID for use as the tracking identifier for the currently encoding Personalized Video;
 b. look up the GUID of the original unaltered video in the tracking database and add the GUID of the currently encoding Personalized Video as an entry associated with tracking the offspring of the original unaltered video;
 c. insert the GUID of the currently encoding Personalized Video into the digital file of the currently encoding Personalized Video;
 d. create a database entry in the tracking database using the GUID of the currently encoding video as the look up key for the tracking of this video's views, product placements and their views;
 e. for each product placement or other personalization modification being tracked, create an entry in the tracking database identifying this personalization modification as applied to this Personalized Video—this is accomplished by adding the GUID of the personalization modification to the database entry for the currently encoding Personalized Video;
 f. for each product placement or other personalization modification being tracked, use the GUID of the personalization modification to look up the tracking database entry for that personalization modification and add the GUID of the currently encoding Personalized Video;
 g. for each personalization modification being tracked, on the first frame the modification is visible within the Personalized Video, insert the GUID of the modification and the logical status of "on" into the metadata, user data or other embeddable information for that specific frame;
 h. for each personalization modification being tracked, on the last frame the modification is visible within the Personalized Video, insert the GUID of the modification and the logical status of "off" into the metadata, user data or other embeddable information for that specific frame.

The result of these steps is a tracking database with the key tables: 1) all the original unaltered videos; 2) each specific Personalized Video; 3) each specific product placement or personalization modification we care to track. Each original unaltered video entry in the tracking database tracks at least the offspring GUIDs of the original video. Each specific Personalized Video entry in the tracking database tracks at least the views of this specific Personalized Video, as well as the existence of any tracked personalization modifications applied to the video. Each personalization modification entry in the tracking database tracks which Personalized Videos received this modification and the accumulated views of this modification across all instances of this modification applied to multiple Personalized Videos.

Description of Apparatus

Figure 10:
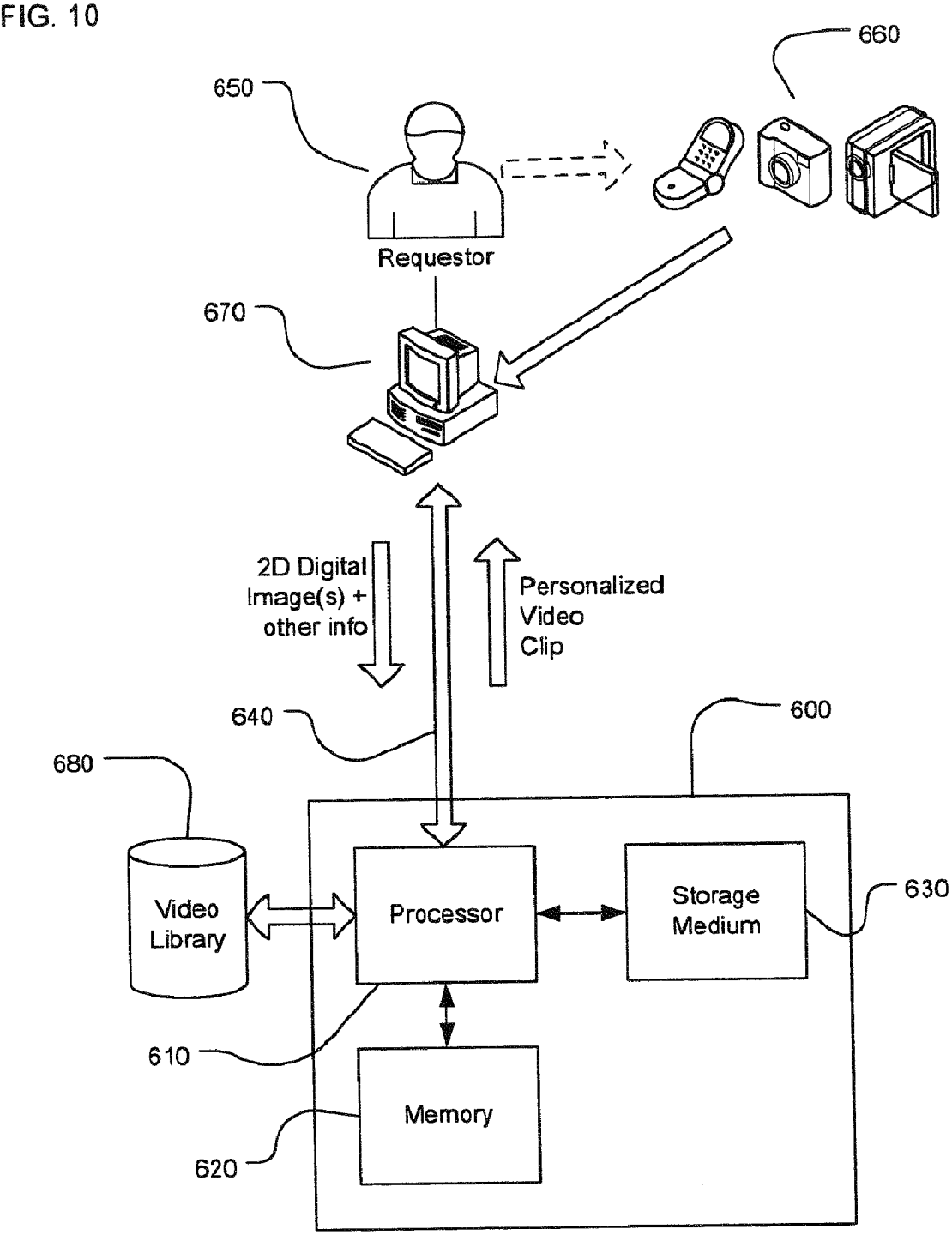
FIG. 10 is a block diagram of a computer apparatus.

A computing device 600 for creating personalized videos is shown in block diagram form in FIG. 10. The computing device 600 may be comprised of a processor 610 in communication with memory 620 and a storage medium 630. The storage medium 630 may hold instructions that, when executed, cause the processor 610 to perform the processes necessary to create a personalized video. The computing device 600 may include an interface to a network 640, such as the Internet or a local area network or both. The computing device 600 may receive a 2D digital image and other information and may deliver a personalized video via network 640. The computing device 600 may interface with a requestor 650 and a digital image source 660 via the network 640 and a remote personal computer 670, or other network-enabled device. The computing device 600 may interface with a video library 680 by means of network 640 or a second interface. It should be understood that the network 640, the computer 670, the requestor 650, the digital image device 660, and the video library 680 are not part of computing device 600.

Computing device 600 may be divided between two or more physical units, including one or more of the following physical units: a web server to interface with the network 640; a file server to interface with the video library 680 and, if present, an actor model library or a product model library; and a dedicated video/graphics processing computer to perform at least a portion of the personalized video creation processes as previously described. If apparatus 600 is divided between multiple physical units, each of the physical units may hold portion of processor 610, memory 620, and storage medium 630. Additional and fewer units, modules or other arrangement of software, hardware and data structures may be used to achieve the processes and apparatuses described herein.

Figure 11:
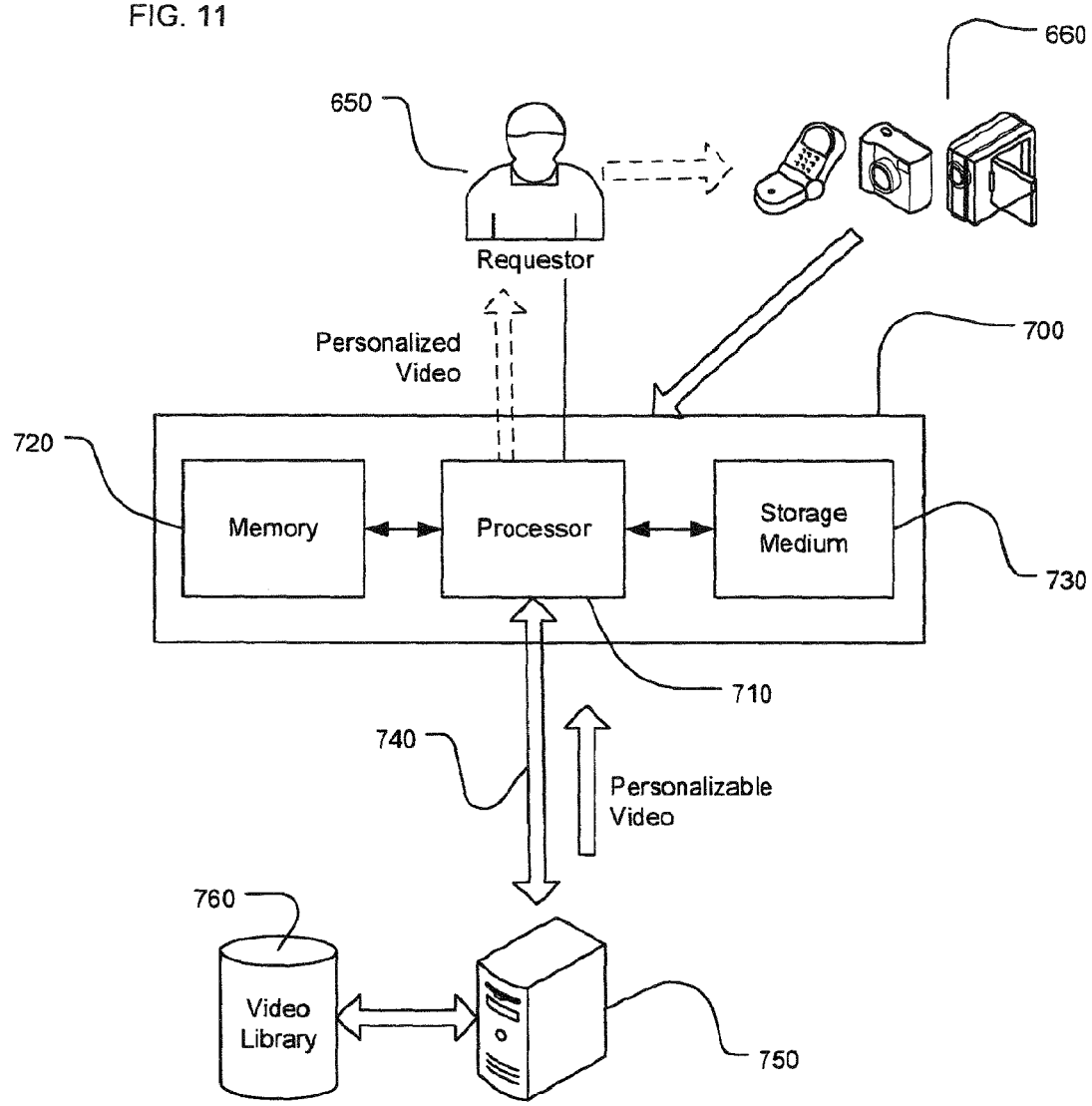
FIG. 11 is a block diagram of another computer apparatus.

Another computing device 700 for creating a personalized video is shown in block diagram form in FIG. 11. The computing device 700 may be comprised of a processor 710 in communication with memory 720 and a storage medium 730. The storage medium 730 may hold instructions that, when executed, cause the processor 710 to perform the processes necessary to create a personalized video. The computing device 700 may include an interface to requestor 650, such as a keyboard, mouse, or other human interface means. The computing device 700 may also have an interface to a digital image device 660, and may receive a 2D digital image from image device 660 via the interface. The computing device 700 may include an interface to a network 740, such as the Internet or a local area network or both. The computing device 700 may receive a prepared personalizable digital video from a remote video library by means of the network 740 and, optionally, a remote server 750. Computing device 700 may then personalize the video. The personalized video may then be presented to user 650 by means of display device, and may be stored in memory 720 or storage medium 730. It should be understood that the network 740, the requestor 650, the digital image device 660, the server 750, and the video library 760 are not part of computing device 700.

In the computing devices of FIG. 10 and FIG. 11, storage medium 630 or 730 may be any storage media in any storage device included with or otherwise coupled or attached to a computing device. These storage media include, for example, magnetic media such as hard disks, floppy disks and tape; optical media such as compact disks (CD-ROM and CD-RW) and digital versatile disks (DVD and DVD±RW); flash memory cards; and any other storage media. As used herein, a storage device is a device that allows for reading and/or writing to a storage medium. Storage devices include hard disk drives, DVD drives, flash memory devices, and others.

A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run any operating system, including, for example, variations of the Linux, Unix, MS-DOS, Microsoft Windows, Palm OS, and Apple Mac OS X operating systems.

The computing device 600 or 700 may include software and/or hardware suitable to perform the functions described herein. The computing device 600 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the computing device 600 may include various specialized units, circuits, software and interfaces for providing the functionality and features described here. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by a client computer and others by other devices.

The foregoing is merely illustrative and not limiting, having been presented by way of example only. Although examples have been shown and described, it will be apparent to those having ordinary skill in the art that changes, modifications, and/or alterations may be made. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. For any means-plus-function limitations recited in the claims, the means are not intended to be limited to the means disclosed herein for performing the recited function, but are intended to cover in scope any means, known now or later developed, for performing the recited function. As used herein, "plurality" means two or more. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. As used herein, "and/or" means that the listed items are alternatives, but the alternatives also include any combination of the listed items.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning. In particular, most words have a generic meaning. If it is intended to limit or otherwise narrow the generic meaning, specific descriptive adjectives will be used to do so. Absent the use of special adjectives, it is intended that the terms in this specification and claims be given their broadest possible, generic meaning. Likewise, the use of the words "function" or "means" in the "detailed description" section is not intended to indicate a desire to invoke the special provisions of 35 U.S.C. 112, Paragraph 6, to define the invention. To the contrary, if it is intended to invoke the provisions of 35 U.S.C. 112, Paragraph 6, to define the inventions, the claims will specifically recite the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to provoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

What is claimed is:

1. A computer-implemented process, comprising:
retrieving an altered digital video file in response to a personalization request, the altered digital video file generated based on an original digital video and a visual element in the original digital video being at least partially removed;
retrieving data about the visual element, the retrieved data including position information and size information of the visual element in the original digital video;
receiving information indicative of a replacement element, the replacement element being associated with the request;
applying the retrieved data, frame by frame, to transform the replacement element into a transformed element having characteristics of the visual element; and
producing a personalized digital video, the producing comprising inserting the transformed element in each frame of the altered digital video file in which the visual element appears in the original digital video.

2. The process of claim 1, wherein producing the personalized digital video file comprises producing a video advertisement that is personalized based on an intended viewer of the personalized digital video.

3. The process of claim 1, wherein receiving information indicative of a replacement element comprises receiving an image associated with the replacement element.

4. The process of claim 3, wherein the image is selected from a plurality of images of candidate objects based upon demographic information of an intended viewer of the personalized digital video.

5. The process of claim 3, wherein the image depicts at least a portion of a product to be advertised to an intended viewer of the personalized digital video.

6. The process of claim 1, wherein producing the personalized digital video file comprises replacing at least a portion of a frame of the altered digital video file with an image that is selected based on the intended viewer of the personalized digital video.

7. The process of claim 1, wherein producing the personalized digital video file comprises replacing at least a portion of a background image of a frame of the altered digital video file with a different background image that is selected based on the intended viewer of the personalized digital video.

8. The process of claim 1, wherein the visual element is an actor.

9. The process of claim 1, wherein the visual element is an object.

10. The process of claim 1, wherein the visual element is a background scene.

11. The process of claim 1, wherein the altered digital video file is generated based on at least a portion of the visual element being substituted by an image that resembles a continuation of a scene adjacent to the visual element in a frame of the original digital video.

* * * * *